United States Patent [19]
Williams et al.

[11] 4,214,334
[45] Jul. 29, 1980

[54] MANUFACTURE OF FOOTWEAR

[75] Inventors: William Williams, Queniborough, England; Michael L. Crane, St Savior, Channel Islands

[73] Assignee: Delplast Limited, Leicester, England

[21] Appl. No.: 963,771

[22] Filed: Nov. 27, 1978

[51] Int. Cl.³ .......................... A43D 9/00; A43B 3/12
[52] U.S. Cl. .................................. 12/142 RS; 36/11.5
[58] Field of Search ........... 12/142 R, 142 S, 142 RS, 12/142 T; 36/11.5

[56] References Cited

U.S. PATENT DOCUMENTS

| 4,024,594 | 5/1977 | Haizinger | 12/142 RS |
| 4,104,754 | 8/1978 | Almao | 12/142 S |

FOREIGN PATENT DOCUMENTS

| 1059901 | 3/1954 | France | 12/142 S |
| 1081545 | 12/1954 | France | 12/142 S |

*Primary Examiner*—Patrick D. Lawson
*Attorney, Agent, or Firm*—Charles E. Brown

[57] ABSTRACT

The invention relates to a method for manufacturing footwear and apparatus for use in the method. The method includes the steps of procuring an upper constituted by at least one strap or band and an insole, assembling the upper and the insole by passing end portions of the strap(s) through apertures provided in marginal portions of the insole and securing the strap end portions to an under surface of the insole, inserting a positioning support within the upper/insole assembly, positioning the assembly in a mould closing member of a moulding apparatus, providing mouldable plastics material to a mould cavity of a second member of the moulding apparatus and closing said mould cavity by means of said mould closing member so as to trap marginal edge portions of the insole against the two mould members.

10 Claims, 10 Drawing Figures

MANUFACTURE OF FOOTWEAR

BACKGROUND TO THE INVENTION

The invention is concerned with improvements in or relating to the manufacture of footwear, particularly casual footwear comprising sandals and other articles of footwear incorporating straps or bands in their construction and having in situ moulded outsoles.

The moulding-on of outsoles to footwear is an expensive and complicated step in the manufacture of casual footwear and it is an object of the invention to provide a method of and apparatus for the manufacture of such footwear which obviates the need for lasts, reduces to a minimum the formation of flash around the edges of the insoles of the footwear so produced and gives considerable economics in skilled labour and cost.

BRIEF SUMMARY OF THE INVENTION

The invention therefore provides a method of manufacturing casual footwear as defined above comprising the steps of procuring an upper constituted by at least one strap or band and an insolve, assembling the upper and the insole by passing end portions of the strap(s) through apertures provided in marginal portions of the insole and securing the strap end portions to an under surface of the insole, inserting a positioning support within the upper/insole assembly, positioning the assembly in a mould closing member of a moulding apparatus, providing mouldable plastics material to a mould cavity of a second member of the moulding apparatus and closing said mould cavity by means of said mould closing member so as to trap marginal edge portions of the insole against the two mould members.

Conveniently, the insole may be provided with at least two apertures at opposed marginal portions thereof, through which the end portions of each strap pass.

Advantageously, the upper may be accurately prepared, that is, the or each strap is pre-cut to an accurately determined length so that, when correctly positioned on the insole, the end portions of the strap(s) are arranged to abut beneath the insole, on a central guide line if required, or so that each extreme edge of the strap(s) is aligned with one of a pair of guide lines each spaced inwardly of the adjacent edges of the insole.

The positioning support for the upper/insole assembly may be a simple forme provided with locating lugs receivable in the mould closing member, and may itself be provided with locating means for the insole.

The marginal portions of the insole may be trimmed after the outsole is formed, and may if desired by trimmed back as far as the apertures in the insole. However, if it is desired to apply a finish to the moulded-on sole, then this may be achieved with a spray apparatus, the excess insole margins acting as a mask or guard against marking the upper. The margins may then be removed by trimming as above.

The invention further provides moulding apparatus for carrying out the above described method, comprising a mould member having a mould cavity therein, corresponding to an outsole to be moulded, a mould closing member adapted to trap marginal portions of the insole in the closed position, and a positioning support capable of accurately locating an upper/insole assembly with respect to the mould cavity.

The invention also provides casual footwear incorporating at least one strap and manufactured by the method according to the invention and on appartus also according to the invention.

BRIEF DESCRIPTION OF DRAWINGS

There will now be described an example of how the invention may be carried out. It will be understood that the description, which is to be read with reference to the accompanying drawings, is given by way of example only and not by way of limitation.

In the drawings.

DETAILED DESCRIPTION OF DRAWINGS

Figure 1:
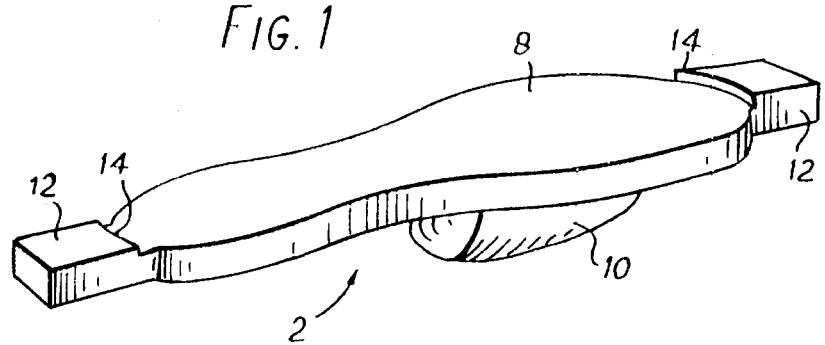
FIG. 1 shows a perspective view of a positioning support.
Figure 2:
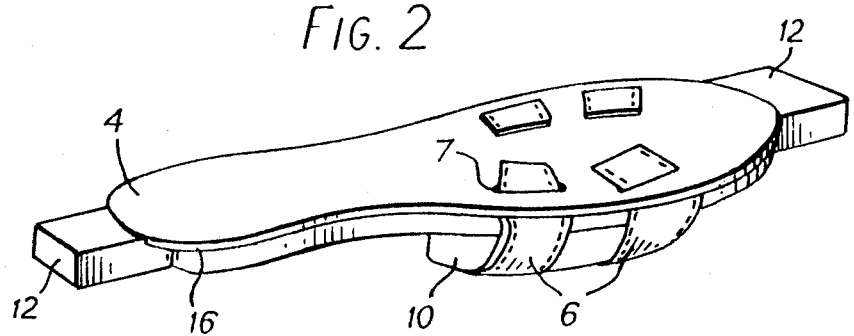
FIG. 2 is a similar view of the support with an upper/insole assembly positioned thereon.
Figure 3:
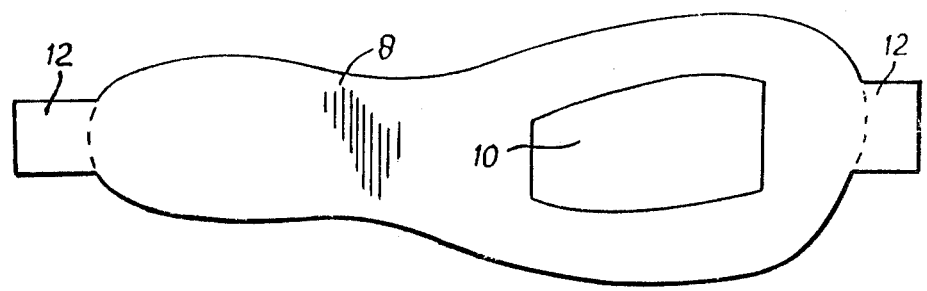
FIG. 3 is a plan view of the support of FIGS. 1 and 2.

FIGS. 1-3 show a positioning support 2 for a sandal comprising an insole 4 and an upper consisting of two transverse straps 6. The support 2 comprises a main portion 8 which when viewed in plan, approximates to the shape of a sole, a raised portion 10 arranged to support the straps and two lugs 12. Two abutment surfaces 14, one on each lug 12, serve to position the insole 4 correctly on the support 2.

It will be observed that marginal portions 16 of the insole project somewhat beyond the support portion 8.

Figure 4:
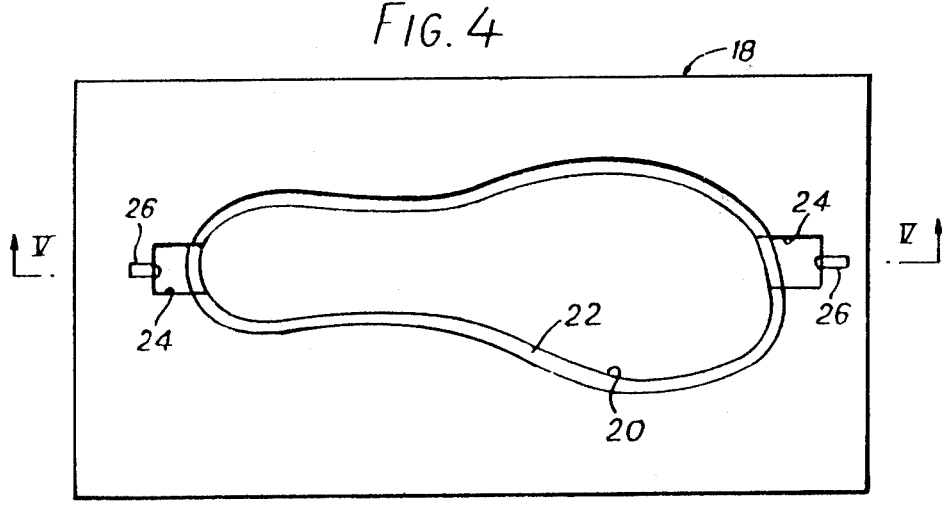
FIG. 4 is a plan view of a mould closing member.
Figure 5:
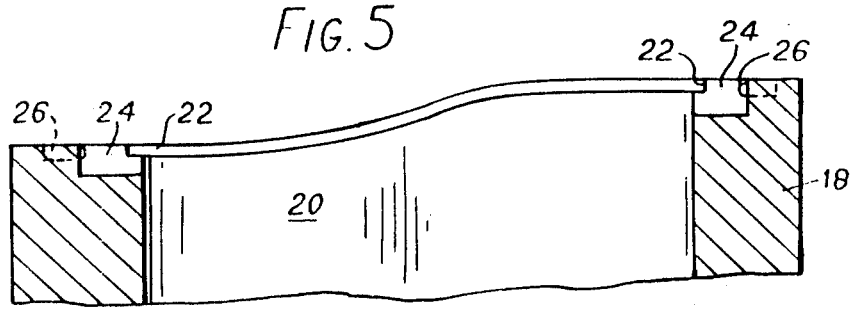
FIG. 5 is a sectional view on line V—V of FIG. 4.
Figure 6:
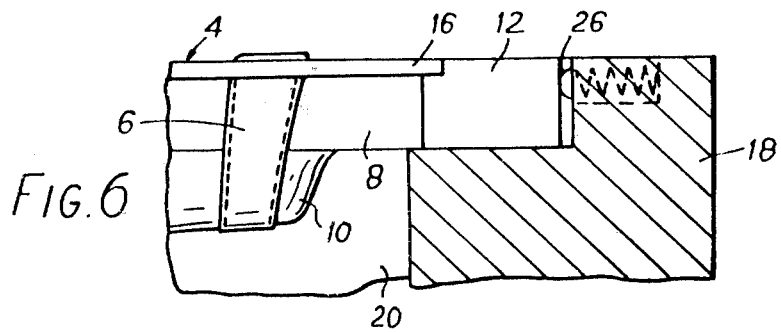
FIG. 6 is an enlarged detail of FIG. 5, including an upper/insole assembly on the positioning support.

FIGS. 4 and 5 show a mould closing member 18 of a moulding apparatus, said member comprising a recess 20, dimensioned to receive the support 2 and including a peripheral groove 22 into which the marginal portions of the insole 4 are received. Further recesses 24 receive the lugs 12, which abut against spring-biassed catches 26 which act to retain the support 12 in position (see FIG. 6).

Figure 7:
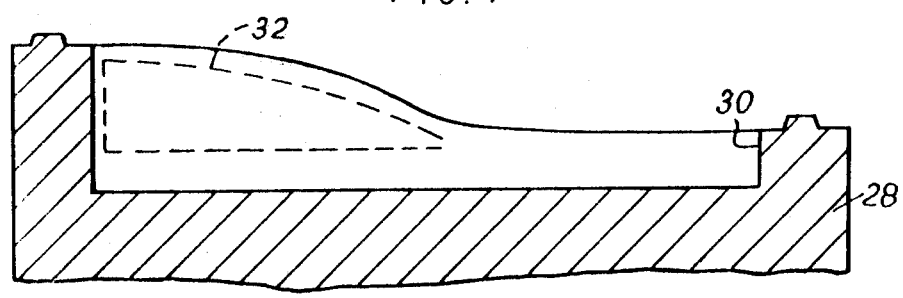
FIG. 7 is a longitudinal section through a second mould member having a mould cavity.

FIG. 7 shows a second mould member 28 of the moulding apparatus including a moulding cavity 30 corresponding in shape to an outsole to be moulded onto the insole 4 of the sandal. Indicated at 32 in broken lines is the position of a heel filler which may be inserted in the conventional way. A shank (not shown) may also be inserted if desired.

The assembly and sole-moulding operation is carried out as follows.

Figure 9:
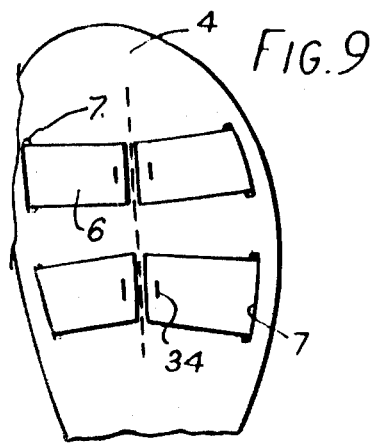
FIGS. 9 and 10 show alternative means for securing the upper to the insole.
Figure 10:
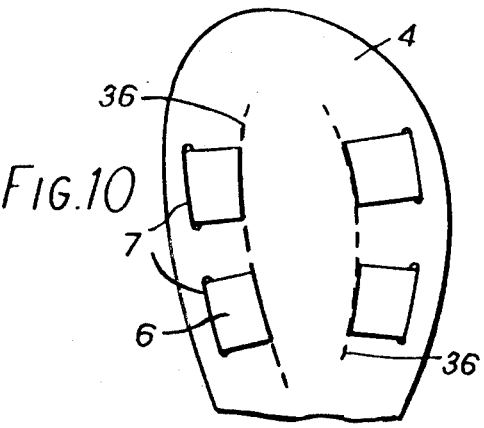

The end portions of the straps 6 of the upper are passed through slots 7 provided in the insole 4 (see FIGS. 2 and 9 or 10), and secured to the underside of the insole either by staples 34 or by adhesive. FIG. 9 shows the abutment of edges of the strap end portions, which, where the straps are accurately pre-cut, ensures the accurate placing of the straps on the insole. FIG. 10 shows the alternative arrangement in which the edges of the strap end portions are aligned with guide lines 36.

The support 2 is now placed within the upper/insole assembly and the whole inserted into the recess 20 of the mould closing member 18 and retained in place by the catches 26. It will be understood that, as an alternative, magnetic catches would also be suitable.

The mould cavity 30 is then provided with a quantity of plastics material sufficient for the formation of a sole unit. Where, as in the present example, the material is polyurethane, the reacting materials are introduced in to the cavity just before it is closed by the mould closing member 18, so that the foaming action takes place in the closed cavity to fill it.

Figure 8:
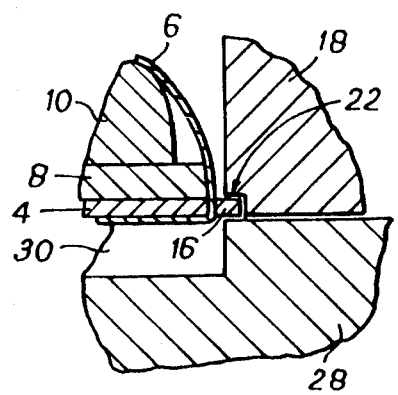
FIG. 8 is a fragmentary sectional view showing the mould cavity in a closed condition.

In closing the mould cavity 30, the moulding closing member 18 raps the marginal edge portions of the insole 4 in the groove 22, as can be seen from FIG. 8. This minimises the formation of "flash".

After the plastics material has set or cured in the cavity, the mould closing member is lifted. The catches 26 are arranged not to be quite strong enough to retain the support 2 within the recess 20 against the effect of the slight adhesion of the outsole to the mould cavity 30, and the sandal therefore remains positioned on the mould member 28. The sandal is de-moulded and the outsole sprayed, if desired, using the margins 16 of the outside as a guard to protect the straps 6. The margins 16 will then be trimmed.

Various modifications may be made within the scope of the invention.

We claim:

1. A method of manufacturing casual footwear as defined herein, comprising the steps of procuring an upper constituted by at least one strap or band and an insole, assembling the upper and the insole by passing end portions of the strap(s) through apertures provided in marginal portions of the insole and securing the strap end portions to an under surface of the insole, inserting a positioning support within the upper/insole assembly, positioning the assembly in a mould closing member of a moulding apparatus, providing mouldable plastics material to a mould cavity of a second member of the moulding apparatus and closing said mould cavity by means of said mould closing member so as to trap marginal edge portions of the insole against the two mould members.

2. A method according to claim 1 wherein each end portion of the or each strap passes through one of two apertures provided in opposed marginal portions of the insole.

3. A method according to claim 2, wherein the strap(s) is/are pre-cut to an accurately determined length so that the end portions of the or each strap are arranged to abut beneath the insole.

4. A method according to claim 2, wherein the strap(s) is/are pre-cut to an accurately determined length so that extreme edges of the end portions of the or each strap are aligned with one of two guide lines, each spaced inwardly of the adjacent edges of the insole.

5. A method according to claim 1 comprising the further steps of moulding a sole member directly on to the under surface of the insole conforming to the mould cavity.

6. A method according to claim 5, comprising the further step of trimming the marginal portions of the insole trapped against the mould members.

7. Moulding apparatus for use in the manufacture of footwear, comprising a mould member having a mould cavity therein corresponding to an outsole to be moulded, a mould closing member adapted to trap marginal portions of the insole in the closed position, and a positioning support capable of accurately locating an upper/insole assembly with respect to the mould cavity.

8. Apparatus according to claim 7, wherein the positioning support comprises a form provided with at least one locating lug projecting therefrom and receivable in a recess in the mould closing member.

9. Apparatus according to claim 7, wherein the form is provided with locating means for accurate location of the insole.

10. Apparatus according to claim 7, wherein the mould closing member is provided with a groove corresponding in shape and size with the marginal protions of the insole and capable of receiving and trapping the same when the mould cavity is closed.

* * * * *